Figure 1:
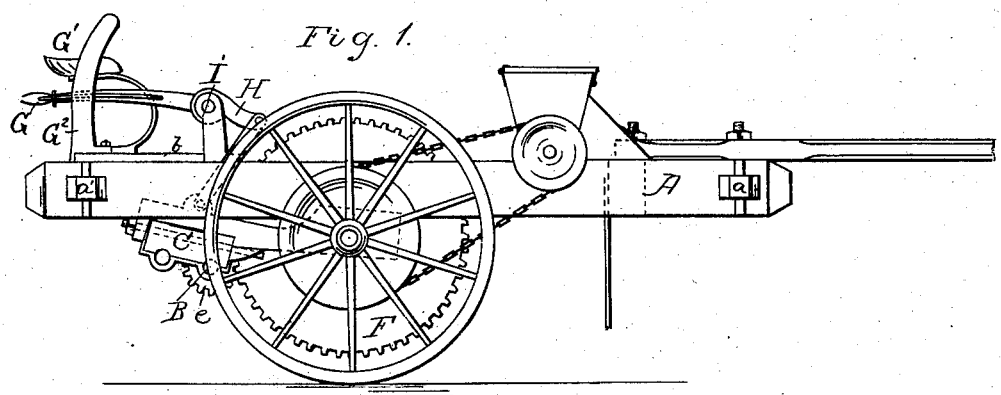

(No Model.) 2 Sheets—Sheet 1.

G. PIRRUNG.
ROTARY PLOW.

No. 260,782. Patented July 11, 1882.

Witnesses:
Charles H. Schoff
H. S. Schoff

Inventor:
Geo. Pirrung
by Coyne & Co.
Attys.

(No Model.) 2 Sheets—Sheet 2.
G. PIRRUNG.
ROTARY PLOW.
No. 260,782. Patented July 11, 1882.
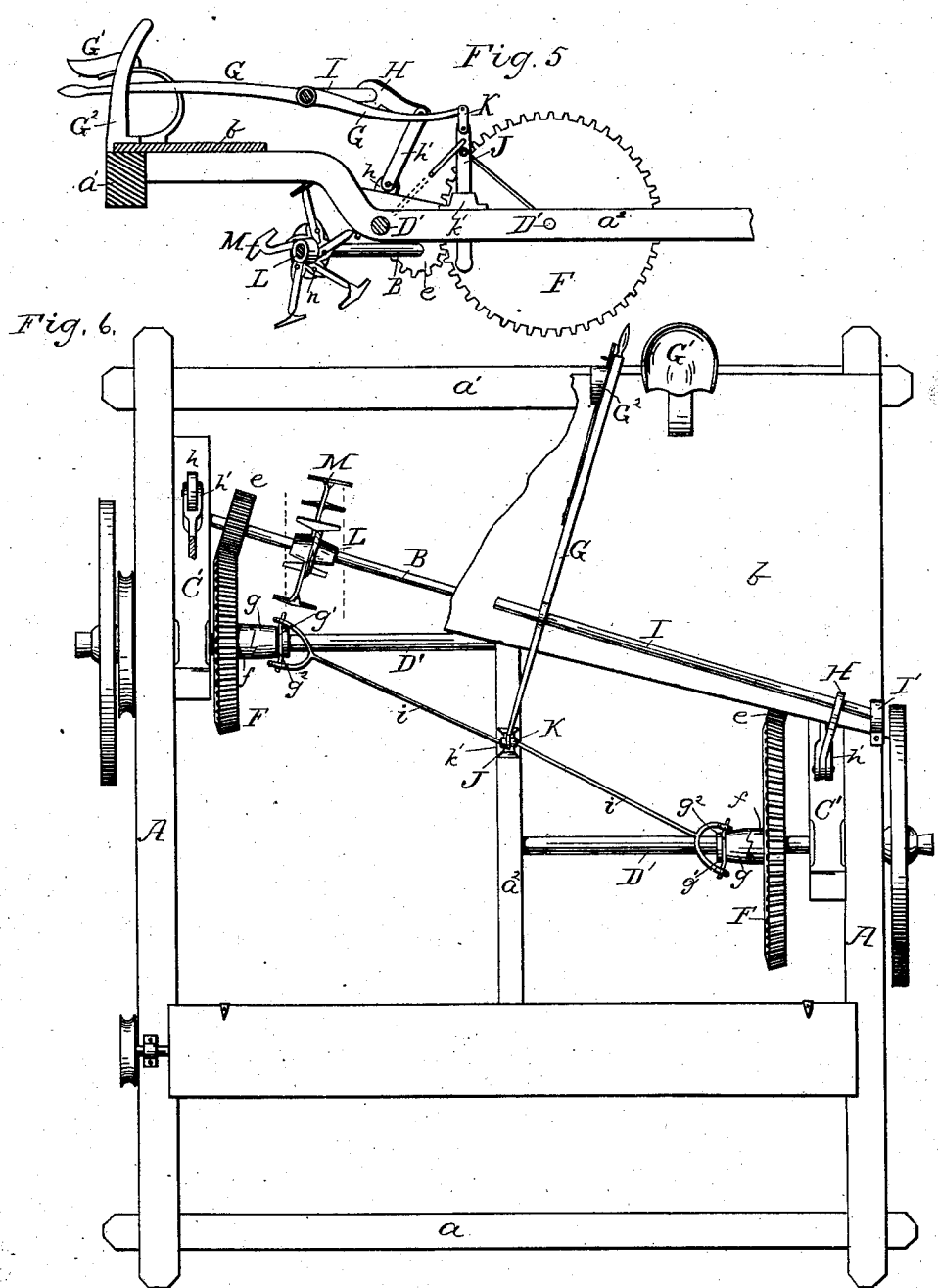

UNITED STATES PATENT OFFICE.

GEORGE PIRRUNG, OF RAVENSWOOD, ILLINOIS.

ROTARY PLOW.

SPECIFICATION forming part of Letters Patent No. 260,752, dated July 11, 1882.

Application filed April 22, 1882. (No model.)

*To all whom it may concern:*

Be it known that I, GEORGE PIRRUNG, of Ravenswood, in the county of Cook and State of Illinois, have invented certain new and useful Improvements in Rotary Plows; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to furnish a rotary plow or digger so constructed as to be perfectly under the control of the operator, capable of being raised to avoid obstacles, and ceasing to rotate when raised, and which will pulverize and break the earth into small particles, instead of making a continuous furrow.

The advantage obtained by this invention is the breaking the soil into small particles and accomplishing in one journey what has heretofore required two journeys with the ordinary and common agricultural implements—namely, one with the plow and the other with a harrow—and as the shaft carrying the rotary plows is placed obliquely to the line of draft it avoids all of those complicated devices used in connection with the pulling-gear. This I accomplish by means of a plowshare and standard wrought or cast in one piece, several of which are inserted into a hub of peculiar construction and rigidly secured therein, several of the hubs being keyed to an oblique shaft, the latter being journaled in bearings, which, being fulcrumed to the axles of the carriage-wheels, is raised or lowered at will by means of a lever. Said oblique shaft is operated by means of the beveled-gear wheels on the revolving carriage-axle meshing with the pinions on the plow-shaft, the whole of which is so constructed that the same movement of the lever which lifts the plow-shaft and plows disengages the clutch, the counterpart of which is found in the boss of the gear-wheels, which cease to rotate or impart motion to the plow-shaft through the medium of the pinions, substantially as described in the following specification, and illustrated in the drawings, in which—

Figure 2:
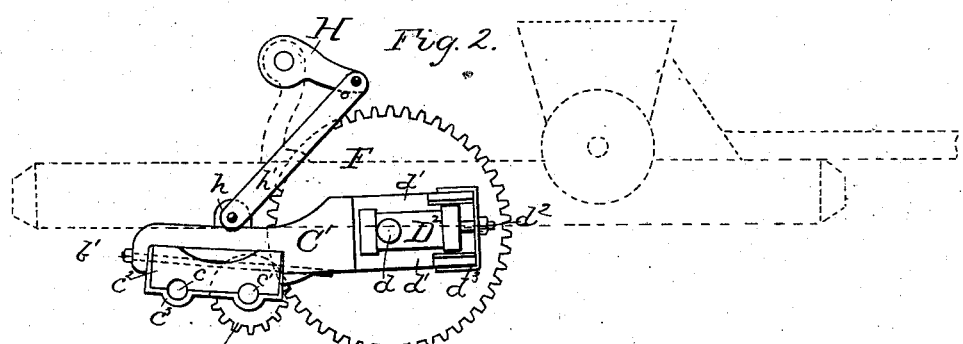
Figures 3, 4:
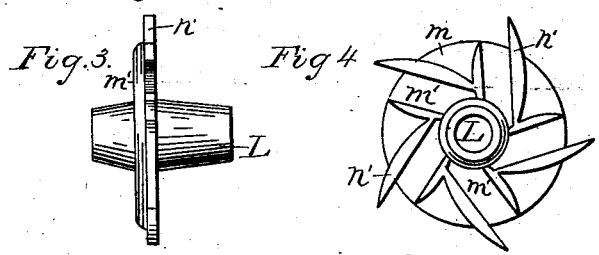

Figure 1 is a side elevation. Fig. 2 is a view showing in detail the bearings of the plow-shaft and the means by which it is raised. Figs. 3 and 4 are front and side views of the hub. Fig. 5 is a vertical longitudinal section, and Fig. 6 is a plan view, of my invention.

In the drawings, A A represent the side pieces, and $a$ $a'$ are the front and back end pieces connecting the said side pieces.

Running centrally and longitudinally from one end piece to the other is a central iron beam, $a^2$, curved upward toward the back end of the machine, so as to afford sufficient play for the rotary plows, and to assist in supporting the platform $b$, running obliquely from right to left in the direction of and over the plow-shaft and covering the back end of the machine, so as to protect the driver from flying particles of earth, said side and end pieces, central beam, and platform forming principally the frame of my machine.

Immediately under the platform $b$, running obliquely to the left, is a plow-shaft, B, journaled in the adjustable bearings C, pivoted to the half-axles D and D'. The adjustable bearing C has two bearing-places, $c$ or $c'$, in either of which the said plow-shaft may be journaled, according as it is desired to obtain a forward or backward rotation of the plows. It is constructed of an inverted pillow and cap, $c^2$ and $c^3$, which fit into a corresponding recess in the lever C', and is secured therein by the bolt and nut $b'$. This bearing of the plow-shaft is made adjustable, because it is often desired to repair or to put more or less of the rotary plows on the shaft, in which case the bolt holding the same would be withdrawn and the bearing moved off the end of the plow-shaft, whereupon the latter can be fixed as desired.

The lever C' is fulcrumed to the carriage-axle, said axle passing through a suitable loose bearing, $d$, in a head, D², which is placed in a suitable rectangular opening, and moves longitudinally on suitable guides, $d'$ $d'$, forming the long sides of said rectangle in the contiguous end of the lever. The position of the said head is regulated by a set-screw, $d^2$, passing through a head band or strap, $d^3$, connecting the outer ends of the guides $d'$ $d'$, the whole of which is adapted to properly adjust the gear, which will be hereinafter fully described. Projecting from the top of said lever C', immediately over the adjustable bearing, is a lug, $h$, to which is pivoted the connecting-rod $h'$, the other end of which is pivoted to the end of the arm H. This arm is made fast on the rock-shaft I, which has suitable bearings in the brackets I', and pursues an oblique course immediately over and in the same direction as the plow-shaft. Said rock-shaft is operated by the lever G, which is fulcrumed to said shaft near its center of length, and the handle of which runs to the back of the machine, near and within easy reach of the driver's seat G', where it is secured at any desired angle by a spring in the side of said lever entering into notches in the upright G², in manner usually adopted for agricultural machines. Keyed to said plow-shaft a proper distance from the bearings are pinions $e$ $e$, which mesh with and are driven by the loose beveled-gear wheel F on the revolving axle D, said axle revolving with the carriage-wheels made fast on the outer ends thereof, and only running half-way across the machine through the central beam, in which they are properly journaled and secured.

Formed in the boss in the inner side of the gear-wheel F is a counter-box, $f$, engaged and disengaged by the clutch $g$, which, by means of a spline in a corresponding place on said axle, has a longitudinal and rotary motion on the same. Said clutch has a circumferential groove, $g'$, in its body, in which is placed a ring, $g^2$, having studs or pins projecting laterally, on which are pivoted the prongs of the fork formed by the contiguous end of the link $i$. These links are connected by means of swivel-joints to the piston J, which is connected at its upper end by the links K to the contiguous end of the lever G, hereinbefore described, and has a vertical reciprocating movement in a suitable guide, $k'$, formed in the central beam, substantially as shown.

It will be understood that the mechanism I have just described is identically similar on both sides of the machine, and like parts have a simultaneous motion. Thus it will be perceived when the lever G is manipulated to raise the plow-shaft, &c., the clutches imparting motion to the gear-wheels will be disengaged, and the plows will cease to rotate, thus avoiding all danger of injuring the machine by the continuous rotation of the plows when raised to avoid obstacles which perchance it may strike.

On the plow-shaft are keyed a suitable number of hubs, L, having a flanged portion, $m$, in the face of which are recesses $m'$, to receive the shank of the removable plows M, secured thereto by bolts and nuts $n$ $n$. These recesses $m'$ may be formed, if desired, by adding to the face of said flanged portion the L-shaped piece $n'$, as shown in Fig. 4.

The plows are preferably formed of one piece of metal, the share being formed by an enlargement, as shown in the drawings, and the standard being rectangular in cross-section.

The hubs may be made to receive any desirable number of these detachable plows. Five, however, are considered a very appropriate number, substantially as shown.

I do not wish to be limited to the application of plows to this mechanism, because it is obvious that it could be used just as well for rotary harrows or pulverizers.

It will be noticed, as shown in dotted lines in Fig. 6, that by placing the plows on an oblique shaft the area covered by the same is materially greater than if the plows had a straight revolution in the direction of the draft. This fact was what impelled me to construct the machine hereinbefore described and illustrated; but it will be seen that by making a continuous axle crossing the machine at right angles, as in the ordinary carriage, and placing the plow-shaft and rock-shaft parallel or running in a similar direction with the same, substantially the same mechanical devices could be used to accomplish the same result.

What I claim as new, and desire to secure by Letters Patent, is—

1. In a rotary plow, the combination, with a hand-lever, of a vertically-reciprocating piston located between the points of termination of the two half-axles, and the two rods connected thereto by swivel-joints extending respectively backward and forward to operate the clutches on the said half-axles, substantially as hereinbefore set forth.

2. In a rotary plow, the combination, with the axles, of the loose gear-wheels F, clutches $g$, rods $i$, piston J, plow-shaft B, pivoted levers C', rock-shaft I, with arm H and link $h'$, and lever G, substantially as and for the purpose specified.

3. In a rotary plow, the combination, with lever C', fulcrumed on the carriage-axle, having a rectangular opening at one end and a recess at the other, of the movable head-block D², set-screw $d^2$, adjustable bearing C, bolt $b'$, and oblique plow-shaft B, substantially as described.

4. A rotary plow consisting of a hand-lever, G, arms H, connecting-rods $h'$, levers C', shaft B, and piston J, rods $i$, clutches $g$, gear-wheels F, and pinions $e$, connected and arranged by the means and in the manner hereinbefore described and set forth.

5. In a rotary plow, the combination of the oblique plow-shaft, having pinions on or near its ends, with two half-axles terminating in a central longitudinal beam having loose gear-wheel meshing with said pinions, the whole arranged to drive said plow-shaft by the mechanism hereinbefore described and set forth.

6. In a rotary plow, a hub, L, having a flange in the face of which are recesses $m'$, formed to receive the shanks or standards of the plows, secured therein by nuts and bolts, as hereinbefore described and set forth.

In testimony that I claim the foregoing as my own I hereunto affix my signature in presence of two witnesses.

GEORGE PIRRUNG.

Witnesses:
FRANK D. THOMASON,
S. S. SCHOFF.